United States Patent
Kindaichi et al.

(10) Patent No.: US 6,532,060 B1
(45) Date of Patent: Mar. 11, 2003

(54) DISTANCE MEASURING APPARATUS

(75) Inventors: Takeshi Kindaichi, Hachioji (JP); Koichi Nakata, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/521,718

(22) Filed: Mar. 9, 2000

(30) Foreign Application Priority Data

Mar. 31, 1999 (JP) .............................. 11-093214

(51) Int. Cl.$^7$ .............................. G01C 3/08; G03B 7/00; G03B 13/18; G03B 13/32; G03B 3/00
(52) U.S. Cl. ...................... 356/4.01; 396/65; 396/138
(58) Field of Search .................... 356/4.06–4.22, 356/3.017, 5.15; 396/65, 7, 70, 138, 139, 89

(56) References Cited

U.S. PATENT DOCUMENTS

| | | | | |
|---|---|---|---|---|
| 5,006,700 A | * | 4/1991 | Kosaka et al. | 250/201.4 |
| 5,204,715 A | * | 4/1993 | Nakanishi et al. | 354/475 |
| 5,389,996 A | * | 2/1995 | Oda et al. | 354/403 |
| 5,606,391 A | * | 2/1997 | Aoki et al. | 354/412 |
| 5,687,402 A | * | 11/1997 | Kishimoto et al. | 396/80 |
| 5,739,901 A | * | 4/1998 | Fujioka et al. | 356/5.01 |
| 5,966,549 A | * | 10/1999 | Hara et al. | 396/54 |
| 6,151,072 A | * | 11/2000 | Tanaka | 348/353 |
| 6,215,961 B1 | * | 4/2001 | Mukai et al. | 396/100 |
| 6,272,289 B1 | * | 8/2001 | Washisu | 396/55 |
| 6,308,014 B1 | * | 10/2001 | Nonaka et al. | 396/106 |

FOREIGN PATENT DOCUMENTS

| JP | 7-199039 | 8/1995 |
|---|---|---|
| JP | 9-5611 | 1/1997 |

* cited by examiner

*Primary Examiner*—Thomas H. Tarcza
*Assistant Examiner*—Brian Andrea
(74) *Attorney, Agent, or Firm*—Frishauf, Holtz, Goodman & Chick, P.C.

(57) ABSTRACT

A distance measuring apparatus has: an AF optical system for dividing object light beams into a pair thereof and forming images and; an AFIC for photoelectrically converting received object optical images in pixels, accumulating charges, and outputting object distance information on the basis of the object image signal. A CPU discriminates whether or not the object is based on a night view or a view in which the night view is the background on the basis of the output of the AFIC or an operation of a night view photographing mode switch, and corrects the object distance to a second predetermined distance shorter than a first predetermined distance when the object is based on the night view or the like and the object distance is longer than the first predetermined distance.

9 Claims, 7 Drawing Sheets

LEFT-SENSOR OUTPUT

RIGHT-SENSOR OUTPUT

DARK ↕ BRIGHT

LEFT-SENSOR OUTPUT

RIGHT-SENSOR OUTPUT

DARK ↕ BRIGHT

DISTANCE MEASURING APPARATUS

BACKGROUND OF THE INVENTION

1. Field of the Invention

The present invention relates to a distance measuring apparatus and, more particularly, to a distance measuring apparatus for measuring a distance to an object to be photographed, based on an optical image which is formed by divided object light beams.

2. Description of the Related Art

In a scene in which a person is photographed by setting a night view to the background, portions having a high luminance exist only in the background of the screen. The person as a main object is photographed almost in a dark-compressed state.

When photographing such a scene by an automatic focusing camera or the like, a distance is measured and a focus is controlled on the basis of a subject whose luminance is high at the background. This might cause a danger that although the user desires to make the person in-focus, the background is erroneously made in-focus.

In order to improve the foregoing, as disclosed in, e.g., Japanese Patent Publication No. 7-199039, auxiliary light is accurately turned on at a night view photographing mode and thus a main object to be photographed is illuminated, thereby detecting an in-focus point to the main object.

As disclosed in, e.g., Japanese Patent Publication No. 9-5611 as another technique, there is provided a distance measuring apparatus for measuring a distance by an active system and a passive system, wherein the distance measurement based on the passive system is inhibited and the distance measurement based on the active system is executed at a night view photographing mode, thereby detecting an in-focus point to a main object.

However, the use of the above-mentioned technique disclosed in Japanese Patent Publication No. 7-199039 does not necessarily provide a suffient effect.

That is, the limit of an arranging space makes it difficult to utilize a light source which emits a sufficiently large quantity of light in an auxiliary light emitting device which is built in a camera. Thus, reflectance might be low, depending on an object. The aforementioned and the like might cause a remarkable decrease in light quantity which is reflected by the main object, and there are many cases where the light quantity is insufficient to clearly photograph a person or the like as a main object from among the background, and it is impossible to measure a distance accurately.

It is possible to devise means for irradiating a full quantity of light to the main object by reducing a distance between a camera and an object so as to accurately measure the distance by employing the auxiliary light. However, if the main object is near, the distance measuring area includes no portion having a high luminance in the background, and an erroneous operation for measuring the distance itself is not executed.

In accordance with the above-discussed technique disclosed in Japanese Patent Publication No. 9-5611, a distance measuring apparatus using a plurality of systems is made necessary. Therefore, not only are costs increased, but also a camera provided with the distance measuring apparatus has a larger size.

Thus using the above-described related art, the problems on erroneous distance measurement cannot be fully solved or it is necessary to waste costs and space so as to improve the distance measuring performance.

SUMMARY OF THE INVENTION

It is an object of the present invention to provide a distance measuring apparatus which is inexpensive and has a small size, wherein a distance measuring value is prevented from largely deviating from a main object even for a scene of a night view or a view based on a night view as a background.

In brief, according to the present invention, there is provided a distance measuring apparatus comprising: light receiving means of a charge accumulating type, having a plurality of pixels, for light-receiving optical images which are formed by light beams of an object to be photographed which are divided into at least one pair and outputting a signal of an object image; distance measuring means for outputting distance information regarding a distance to the object, based on an output by the light receiving means; night view discriminating means for discriminating whether or not a photographing object situation is a night view or a view in which a night view is a background, based on a result to detect whether or not a mode is set and operated to a night view photographing mode by a manual operating member or a result to calculate the output by the light receiving means; and correcting means for outputting a correct value to correct an output by the distance measuring means to a predetermined direction when the night view discriminating means determines that the photographing object situation is the night view or the view in which the night view is the background and the output by the distance measuring means is equal to or greater than a predetermined distance.

According to the present invention, there is also provided a distance measuring apparatus for image-forming light from an object to be photographed on at least one pair of photoelectric converting element arrays through at least one pair of light receiving means and calculating an object distance from at least two object image signals obtained, comprising: distance discriminating means for discriminating whether or not the object distance as a distance measuring result is shorter or longer than a first predetermined distance; night view discriminating means for discriminating whether or not the object is based on a night view or a view in which a night view is a background; and distance measuring result changing means for changing and setting the object distance as the distance measuring result to a second predetermined distance when the distance discriminating means determines that the object distance is longer than the first predetermined distance and the night view discriminating means determines that the object is based on the night view or the view in which the night view is the background.

Further, according to the present invention, there is provided a distance measuring means in a camera for receiving light from an object by light receiving means, obtaining an object image signal, and controlling a focus on the basis of the obtained object image signal, comprising: in-focus distance predicting means for predicting an absolute position of an in-focus distance of a focus control optical system after in-focus driving from a focus detecting result, and predicting whether or not the absolute position is within a predetermined range; night view discriminating means for discriminating whether or not the object is based on a night view or a view in which a night view is a background; and focus control correcting means for correcting the in-focus distance to a predetermined drive quantity to be shorter than the predetermined range when the in-focus distance predicting means determines that the in-focus distance is within the predetermined range and the night view discriminating means determines that the object is based on the night view or the view in which the night view is the background.

These object and advantages of the present invention will become further apparent from the following detailed explanation.

DESCRIPTION OF THE PREFERRED EMBODIMENTS

Embodiments of the present invention will be now described with reference to drawings.

FIGS. 1 to 8 show the first embodiment of the present invention.

Figure 2:
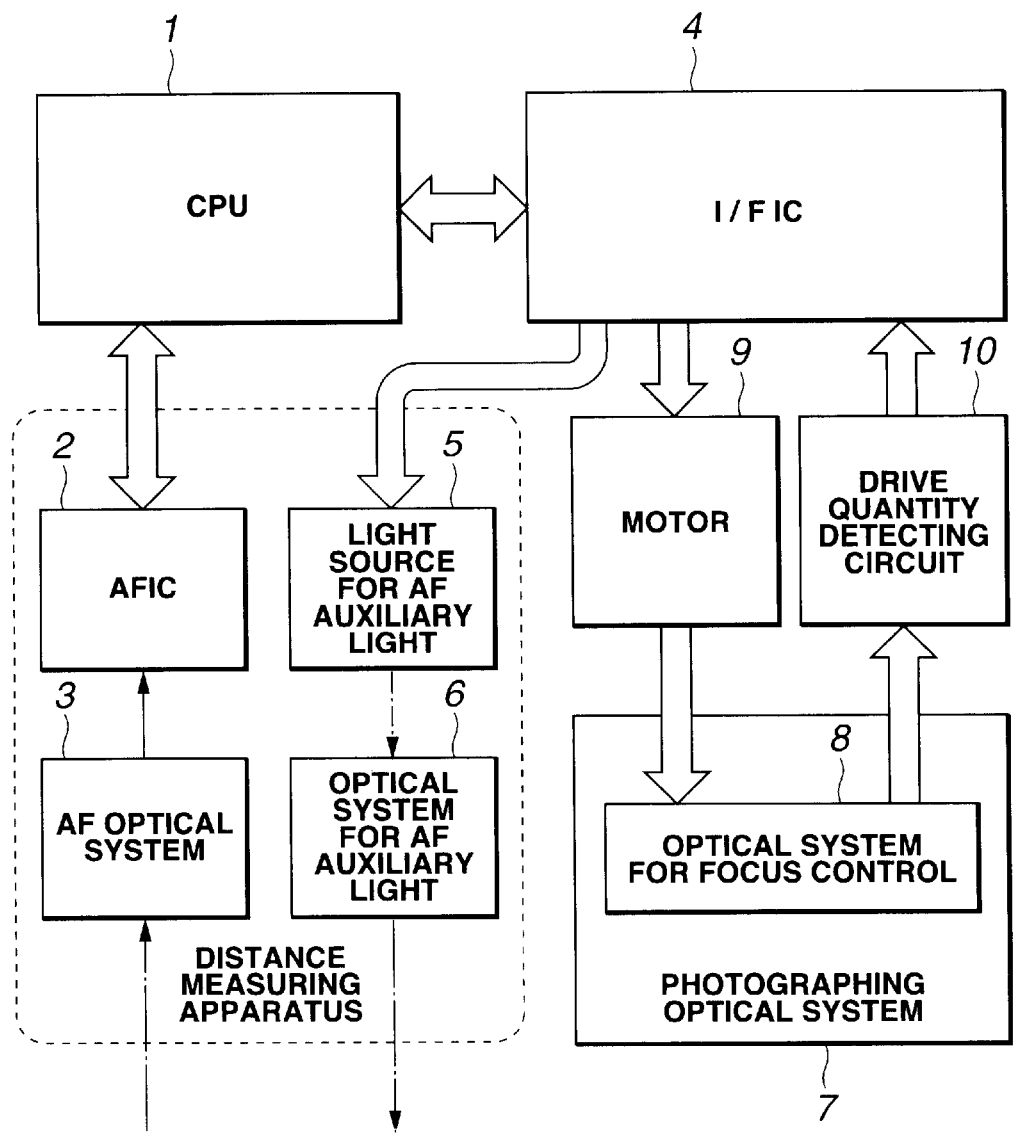
FIG. 2 is a block diagram showing a main portion of an automatic focusing (AF) camera construction having the distance measuring apparatus according to the first embodiment.

The first description relates to the construction of a camera to which a distance measuring apparatus is applied with reference to FIG. 2. FIG. 2 is a block diagram showing a main portion of an automatic focusing (AF) camera having a distance measuring apparatus.

This camera executes various calculations and operational control, etc., and comprises a CPU 1 having night view discriminating means, correcting means, distance discriminating means, distance measuring result changing means, in-focus distance predicting means, focus control correcting means, integrating time discriminating means, integrating width discriminating means, and integrating average discriminating means. An interface IC 4 is provided for outputting a control signal to circuits in response to an instruction from the CPU 1; a light source 5 is provided for AF auxiliary light for light-emitting auxiliary light for automatic focusing in response to a control signal from the interface IC 4; and an optical system 6 is provided for AF auxiliary light for projecting light emitted from the light source 5 for AF auxiliary light to an object to be photographed. An AF optical system 3 for converges light from the object; and an AFIC 2 serves as light receiving means and distance measuring means for calculating a distance to the object by the light converged by the AF optical system 3. A motor 9 is driven and controlled through the CPU 1 and interface IC 4 on the basis of an object distance measured by the distance measuring apparatus having the AFIC 2, AF optical system 3, light source 5 for AF auxiliary light, and optical system 6 for AF auxiliary light. An optical system 8 is provided for focus control in a photographing optical system 7 whose position is changed by a driving force of the motor 9; and a drive quantity detecting circuit 10 is provided for detecting a drive quantity of the optical system 8 for focus control by the motor 9.

It is noted that many distance measuring apparatuses are constructed by a unit in a camera, and corresponding to this construction, FIG. 2 illustrates the distance measuring apparatus comprising the AFIC 2, AF optical system 3, light source 5 for AF auxiliary light, and optical system 6 for AF auxiliary light. A and also a part of the function of the distance measuring apparatus is executed by the CPU 1 and the like built in the camera main body.

The operation of the camera shown in FIG. 2 is as follows.

When a photographer presses a release switch (not shown), the CPU 1 detects the press and an operation for measuring a distance is started.

At this time, the CPU 1 commands the initialization of the AFIC 2. Next, the AFIC 2 photoelectrically converts an object image which is made incident via the AF optical system 3 and starts to integrate the signals.

The CPU 1 monitors a progress situation for the integrating operation by the AFIC 2 and turns on the light source 5 for AF auxiliary light via the interface IC 4 if the necessity arises. The light-on of the light source 5 for AF auxiliary light is normally controlled similarly for the case when the luminance of the object is low and, of course, even in the case of a photographing scene which is a night view or view in which the night view is a background.

When turning on the auxiliary light, the CPU 1 allows the AFIC 2 to interrupt the integration and also reset the integrating value, and commands the AFIC 2 to start the integrating operation again in a state of lighting-on the auxiliary light.

If the AFIC 2 completes the operation for integrating the object image signal, the CPU 1 or AFIC 2 calculates a distance measurement, thereby ending the distance measurement.

Subsequently, the CPU 1 allows light measuring means (not shown) to measure a luminance of the object.

Based on the distance measuring result and the light measuring result obtained in the above manner, the CPU 1 calculates the exposure including up to light quantity control of a strobe (not shown) and controls the focus of the photographing optical system 7.

The focus of the photographing optical system 7 is controlled by driving the optical system 8 for focus control of the photographing optical system 7.

That is, the drive quantity of the optical system 8 for focus control is calculated on the basis of the distance measuring result. The CPU 1 drives the optical system 8 for focus control through the interface IC 4 and motor 9, based on the obtained drive quantity.

The drive quantity detecting circuit 10 detects a position of the optical system 8 for focus control. Based on the detecting result, the optical system 8 for focus control is further feedback-controlled.

If the object image is in-focus onto a film surface (not shown), the focus control (automatic focusing) operation is finished.

Further, a shutter (not shown) is opened in accordance with an exposing condition obtained by the exposure calculation, and the object image is exposed to the film. If a predetermined time elapses according to the exposing value, the shutter is closed, and the exposure is completed, the CPU 1 rolls up one frame of the film and a mode enters an input standby state to await the next operation.

As explained above, a series of photographing operations is performed by the camera including the distance measuring operation.

Figure 3:
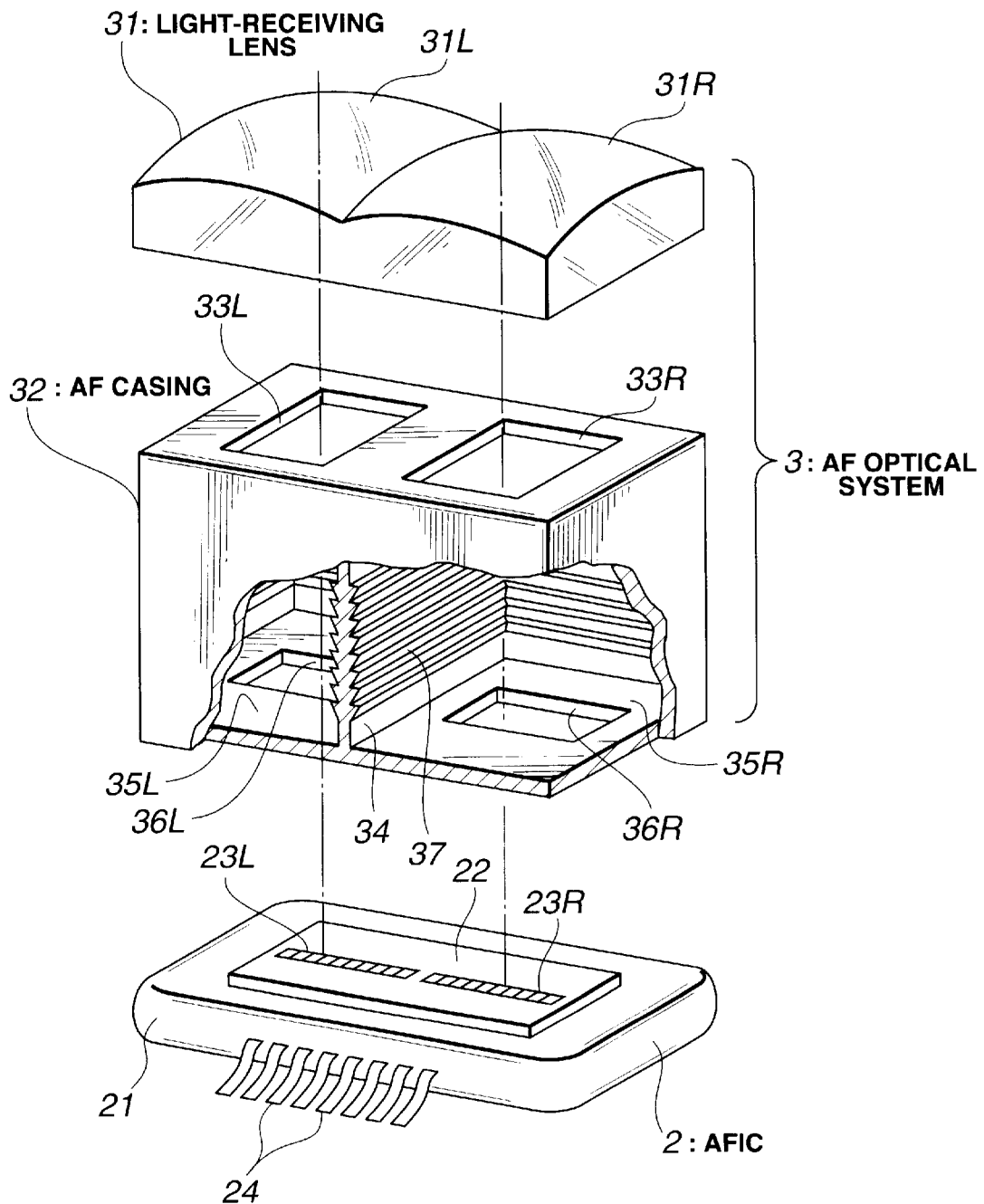
FIG. 3 is an exploded perspective view showing a construction of an AFIC and an AF optical system in the distance measuring apparatus according to the first embodiment.

FIG. 3 is an exploded perspective view showing a construction of the AFIC 2 and AF optical system 3 in the distance measuring apparatus.

The AF optical system 3 has: a light-receiving lens 31 for converging the object image light to the AFIC 2; and an AF casing 32 made up of a casing member for holding the light-receiving lens 31 and AFIC 2 at a predetermined interval.

The light-receiving lens 31 is constructed by, for example, integrally forming a pair of light-receiving lenses, namely, a right light-receiving lens 31R and a left light-receiving lens 31L, by utilizing a transparent material.

The AF casing 32 is divided, by a partition 34 provided in the AF casing 32, into a right chamber 35R and a left chamber 35L corresponding to the right light-receiving lens 31R and left light-receiving lens 31L, respectively. Rectangular holes 33R and 33L pierce through the sides of the chambers 35R and 35L, which face to the light-receiving lens 31. Rectangular holes 36R and 36L pierce through the sides thereof, which face to the AFIC 2. A grooved structure portion 37 is formed to internal walls of the right and left chambers 35R and 35L in order on the prevent light from being diffused and reflected.

The AFIC 2 has: a light receiving portion 22 which is packaged into a transparent mold; and a main body portion 21 in which there are formed a circuit, etc. for processing a signal outputted from the light receiving portion 22. The light receiving portion 22 comprises a right photoelectric converting element array 23R and a left photoelectric converting element array 23L for photoelectrically converting incident light through the right and left light-receiving lenses 31R and 31L, respectively. Extended from a side portion of the main body portion 21 are a plurality of connecting terminals 24 for outputting a signal after processing to the CPU 1.

Figure 4:
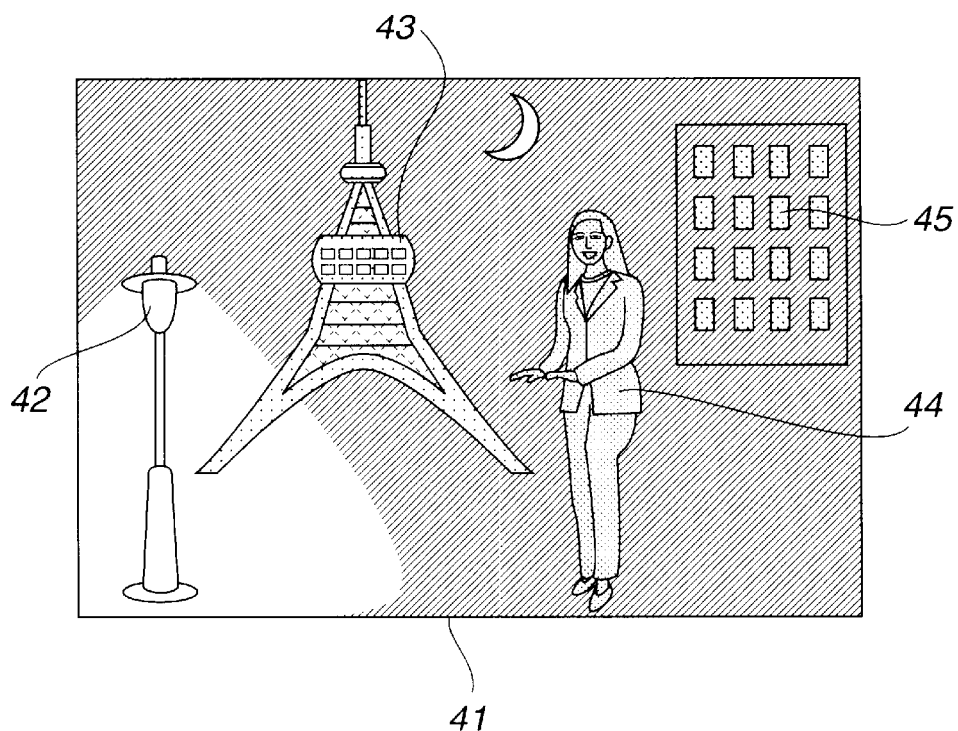
FIG. 4 is a diagram showing one example of a photographing scene when a main object is based on a night view according to the first embodiment.

FIG. 4 is a diagram showing one example of a photographing scene when a main object is based on a night view as a background.

A photographing scene in FIG. 4 shows an example in which a streetlight 42 having a high luminance is positioned, on the left side of a picture plane 41; a tower 43 having a little high luminance, on the slightly left side of the center of the picture plane 41; a person 44 having a low luminance who becomes a main object to be photographed, on the right side of the center the picture plane 41; and a building 45 having a little low luminance, on the right side of the picture plane 41.

Figure 5:
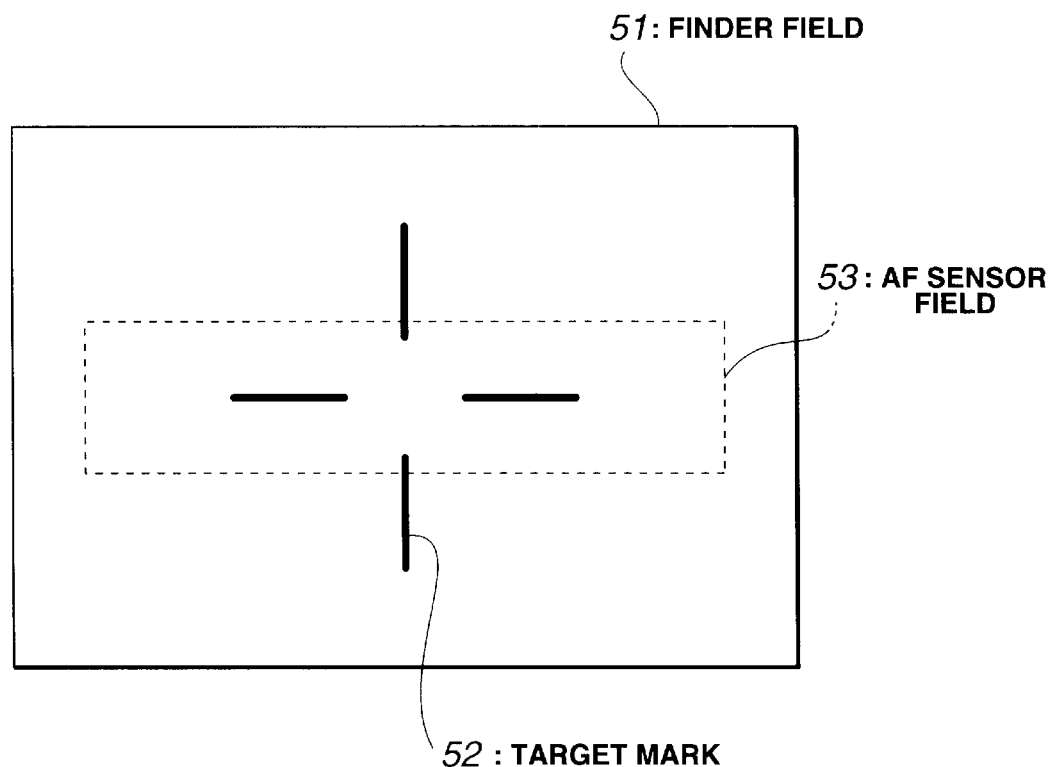
FIG. 5 is a diagram showing a positional relationship between a target mark and an AF sensor field in a finder field according to the first embodiment.

FIG. 5 is a diagram showing a positional relationship between a target mark 52 and an AF sensor field 53 indicated in a finder field 51.

Referring to FIG. 5, the target mark 52 is displayed in the finder field 51. Further, the AF sensor field indicates a state in which it is widened in a rectangular form whose width is longer than the length at the center portion of the picture plane, as shown by reference numeral 53, in the finder field 51.

The AF sensor field 53 shows an area corresponding to a range of the object whose image is formed on the photoelectric converting element arrays 23R and 23L of the AFIC 2 through the AF optical system 3.

Figure 6A:
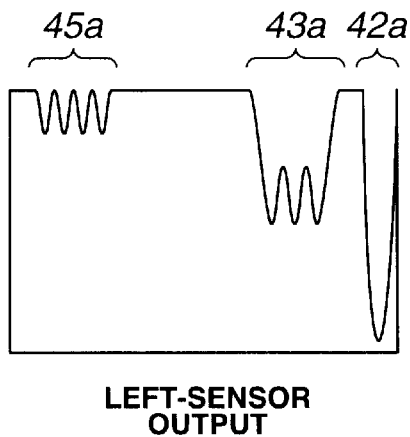
FIGS. 6A and 6B are diagrammatic views showing states of an object image signal obtained by the AFIC when measuring a distance to the scene as shown in FIG. 4.
Figure 6B:
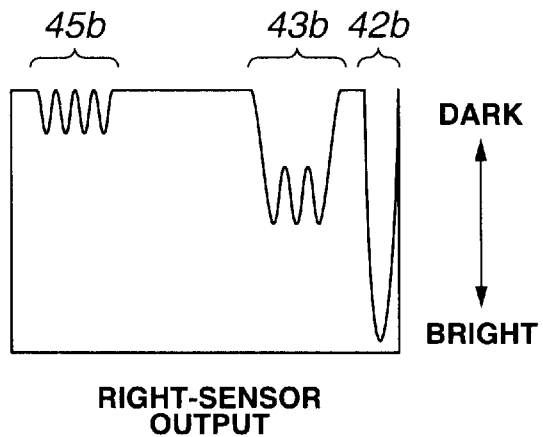

FIGS. 6A and 6B are diagrammatic views showing states of an object image signal obtained by the AFIC 2 when measuring a distance to the scene as shown in FIG. 4.

According to the AFIC 2 of the present embodiment, a photocurrent obtained from the photoelectric converting element arrays 23R and 23L are integrated from a predetermined reference voltage to the GND side. Therefore, a level of the object image signal is made low in a bright portion and high in a dark portion.

The AFIC 2 construction to integrate the photocurrent from GND to Vcc might enable the bright/dark level of the object image signal to reverse.

FIGS. 6A and 6B illustrate a sensor output of the left photoelectric converting element array 23L and a sensor output of the right photoelectric converting element array 23R, respectively, in the case of distance-measuring the scene as shown in FIG. 4.

In other words, an output of the streetlight 42 having a high luminance is at the lowest level as shown by reference numerals 42a and 42b. An output of the tower 43 having a slightly high luminance is, for instance, at an about middle level corresponding to the luminance, as shown by reference numerals 43a and 43b. An output of the building 45 having a slightly low luminance is, for example, at a slightly high level corresponding to the luminance, as shown by reference numerals 45a and 45b.

It is to be noted that with respect to the sensor outputs in FIGS. 6A and 6B, the building 45, tower 43, and streetlight 42, etc. are placed in a right and left arranging order opposite to that in FIG. 4, because the AF optical system 3 is constructed by a single lens. Accordingly, the generation of the object image signal can have a variation, depending on lens construction and the like.

Since the person 44 as a main object is distant from an illuminating range of the streetlight 42 in the photographing scene shown in FIG. 4, the luminance is low and the image signal can be hardly obtained.

Therefore, if calculating the distance measurement on the basis of the sensor output in FIGS. 6A and 6B, it is exemplified that the distance to the tower 43 (far or infinite distance) might be calculated and this might cause the person 44 as a main object to be out of focus.

Figure 7A:
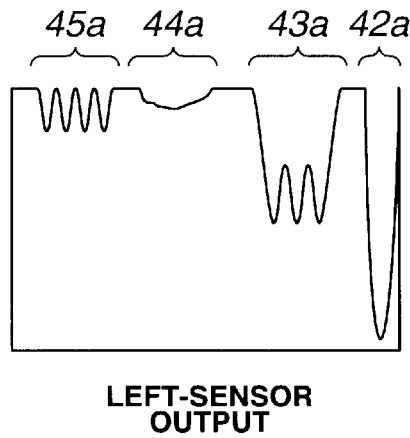
FIGS. 7A and 7B are diagrammatic views showing states of the object image signal obtained by the AFIC when the auxiliary light is turned on and a distance measurement is conducted for the scene as shown in FIG. 4.
Figure 7B:
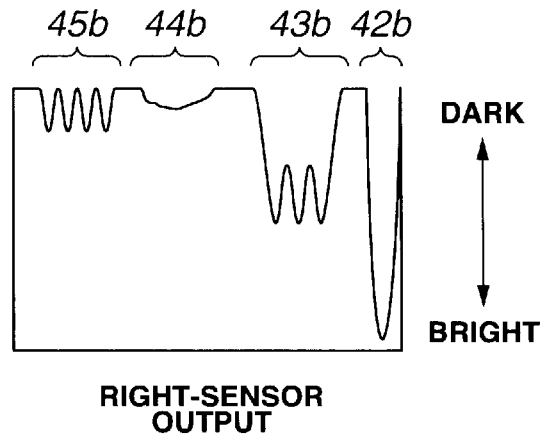

FIGS. 7A and 7B are diagrammatic views showing states of the object image signal obtained by the AFIC 2 when the auxiliary light is turned on and a distance measurement is conducted for the scene as shown in FIG. 4.

In detail, a sensor output of the left photoelectric converting element array 23L is as shown in FIG. 7A and a sensor output of the right photoelectric converting element array 23R is as shown in FIG. 7B.

If the person 4 as a main object has a low luminance, the image signal can be hardly obtained as shown in FIGS. 6A and 6B. Thus, when tentatively increasing the luminance of the person 44 by turning on the light source 5 for AF auxiliary light, the resultant sensor outputs are exemplified in FIGS. 7A and 7B.

Referring to those examples, although the image outputs of the person 44 are slightly obtained as shown by reference numerals 44a and 44b, it is still incapable of obtaining a sufficient contrast.

Consequently, in almost the same manner as those in FIGS. 6A and 6B, the obtained distance measurement almost results in, for instance, the distance to the tower 43 (far or infinite distance). The person 44 as a main object is also out of focus.

Figure 1:
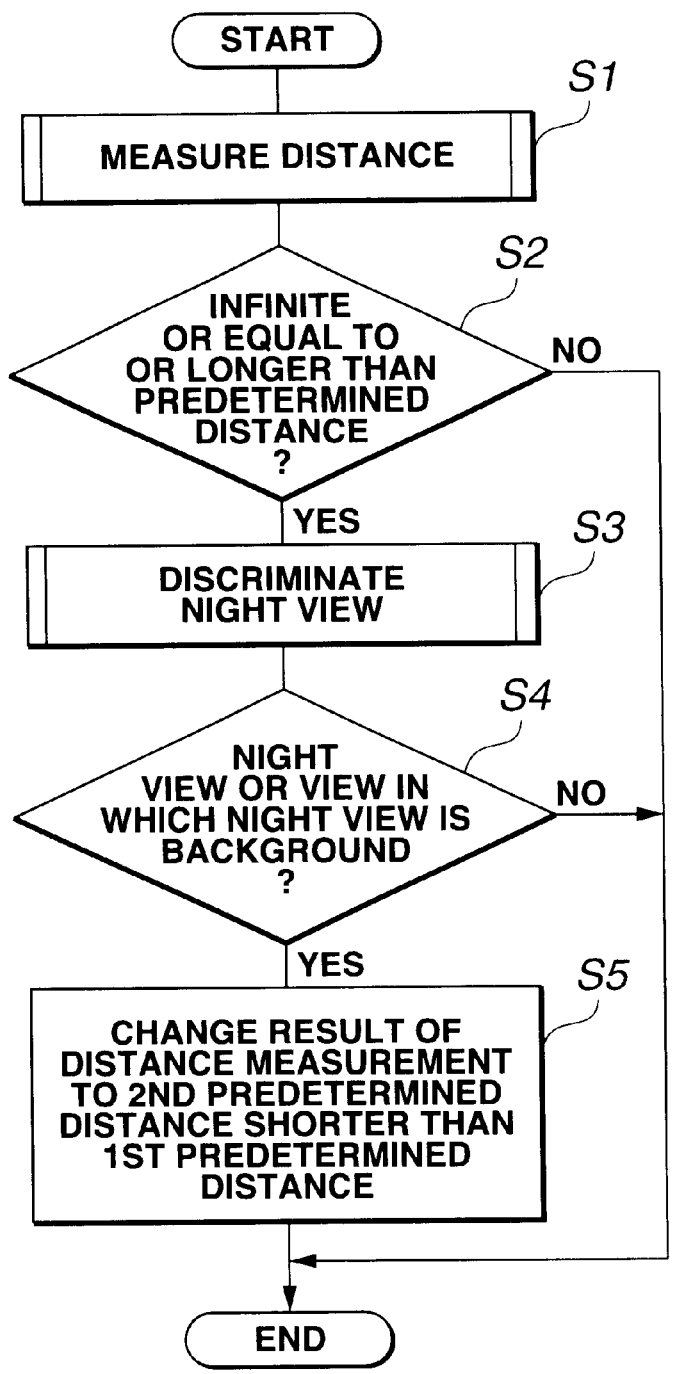
FIG. 1 is a flowchart showing a main operation of a distance measuring apparatus according to a first embodiment of the present invention.

A process shown in FIG. 1 is devised so as to prevent the main object from being extremely out of focus in the case where it is difficult to bring the main object into focus even by using the auxiliary light.

FIG. 1 is a flowchart showing a main operation of the distance measuring apparatus.

When starting the operation of the distance measuring apparatus, a distance is measured according to an ambient light passive system, which has been conventionally well-known. (step S1).

It is discriminated whether or not the distance measuring result is infinite or equal to or longer than a first predetermined distance (step S2). If it is determined that it is shorter than the first predetermined distance, the distance measuring result is used as it is. Therefore, the processing routine ends without performing any other processes.

If it is determined in step S2 that the distance is infinite or equal to or longer than the first predetermined distance, the photographing scene is analyzed by a subroutine "night view discrimination" (step S3). Based on the analyzing result, it is discriminated whether or not the main object is a night view itself or a view in which the night view is the background (step S4).

If it is determined that the photographing scene is neither the night view nor a view in which the night view is the background, the distance measuring result in step SI is utilized as it is. Therefore, the processing routine ends without performing any other processes.

By contrast, if it is determined in step S4 that the photographing scene is the night view or a view in which the night view is the background, the distance measuring result is changed to a second predetermined distance (step S5).

A relationship indicated by the following expression 1 is established between the second predetermined distance and the first predetermined distance.

(First predetermined distance)≧(second predetermined distance). . . (Expression 1)

In other words, the second predetermined distance is shorter than the first predetermined distance.

When ending the process in step S5, the operation for the distance measuring apparatus is finished.

The next description related to the discrimination for the night view in step S3.

To begin with, referring to FIGS. 6A, 6B, 7A, and 7B, characteristics of the object image signal are described in the case where the object is the night view itself or a view in which the night view is the background.

There are both the bright portion (whose luminance is high) and the dark portion (whose luminance is low)in the night view, etc., and many cases where the luminance difference therebetween is large. As a consequence, this case causes a characteristic that a dynamic range of the image signal rises, as shown in FIGS. 6A, 6B, 7A and 7B.

An area occupied by the dark portion often becomes larger than an area occupied by the bright portion in the night view, etc. As explained in the present embodiment, the construction such that the output level is increased in the dark portion has a characteristic that an average output level of the image signal might be raised.

On the contrary, in the case of the night view in which the area occupied by the bright portion is larger, if a main object is a person, it is considered that the contrast output can be sufficiently obtained as the image signal of the person. Therefore, the person can be distance-measured, and is not photographed in an out of focus state.

Figure 8:
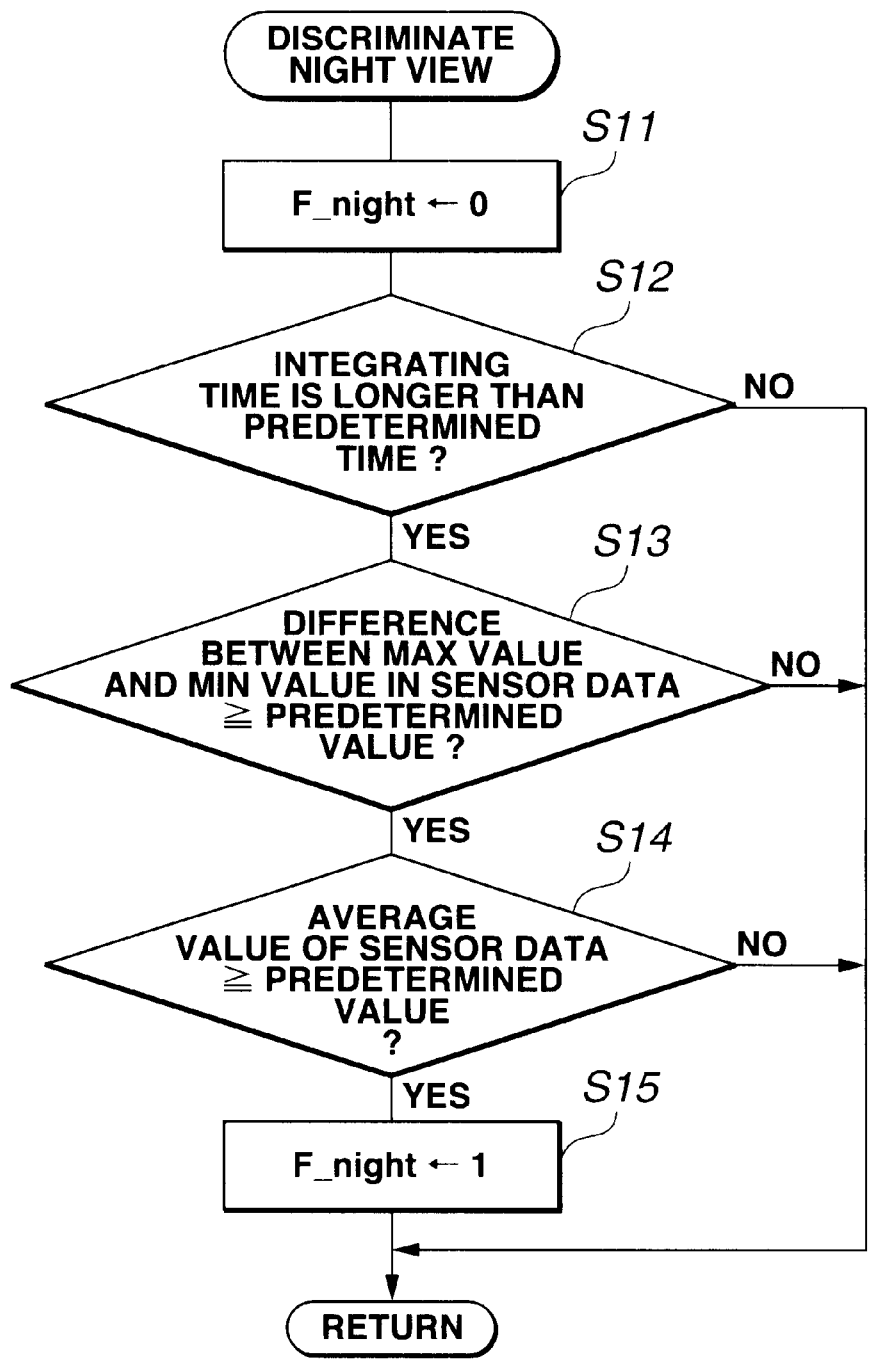
FIG. 8 is a flowchart showing details of a process for discriminating a night view in step S3 in FIG. 1.

FIG. 8 is a flowchart showing details of the process for discriminating the night view in step S3.

Starting the process for discriminating the night view, a first step is implemented to clear to 0, a flag F_night indicative of whether or not the object is the night view itself or a view in which the night view is the background (step S11). If F_night=0, it is determined that the object is not the night view, etc. If F_night=1, it is determined that the object is the night view, etc.

Next, it is discriminated whether or not an integrating time of the distance measuring operation by the AFIC 2 is longer than a predetermined time (step S12). As a result of this discrimination, the object in the night view, etc. has a low luminance, so that the integrating time generally becomes longer. When the integrating time is shorter than the predetermined time, the object is not the night view, etc., and the processing routine ends without changing the value of the flag F_night.

If the integrating time is longer than the predetermined time, it is discriminated whether or not a difference between a maximum value and a minimum value of the sensor data as an image signal is equal to or greater than the predetermined value (step S13). This is a process for discriminating whether or not the aforementioned dynamic range of the image signal is large. If the level difference of the sensor output is smaller than the predetermined value, the processing routine also ends without changing the value of the flag F_night.

On the other hand, if the level difference of the sensor output is equal to or greater than the predetermined value, it is further discriminated whether or not an average value of the sensor data is equal to or greater than a predetermined value (step S14). If the average value of the sensor output level is smaller than the predetermined value, the processing routine ends similarly to the foregoing without changing the value of the flag F_night.

If the average value of the sensor output level is equal to or greater than the predetermined value, it is determined that the object is the night view, etc., the value of the flag F_night is set to be equal to 1 (step S15), and the processing routine thereafter ends.

It is determined that the object is the night view, etc., only when the integrating time is longer than the predetermined time, the difference between the maximum value and the minimum value of the sensor data is equal to or greater than the predetermined value, and the average value of the sensor data is equal to or greater than predetermined value.

Note that the discrimination for night view in FIG. 8 is one example and the present invention is not restricted by this means for discriminating the night view. That is, the discrimination for night view has a wide variation which is different from the above, and it is possible to widely apply those to the present invention.

The following is exemplified as another means for discriminating the night view.

As a first example, if setting a night view photographing mode by a mode setting switch provided for a camera and the like, it is considered to discriminate whether an object is a night view, etc. or not by detecting a state of the switch.

As a second example, it is possible to consider means whereby if the integrating time is longer than a predetermined time and almost all image signals include a steep edge, in other words, difference data of adjacent image signals is obtained (edge emphasizing process) and the image signal has a great number of large edges, it is determined that the object is the night view, etc.

As a third example, it is possible to consider means whereby if auxiliary light is lit and the image signal of the object is not obtained, it is determined that the object is the night view, etc.

As a fourth example, it is possible to consider means whereby if the image signal has a trough whose width is narrower than a predetermined width and depth is deeper than a predetermined depth or a peak whose width is narrower than a predetermined width and height is higher than a predetermined height, it is determined that the object is the night view, etc.

As a fifth example, it is possible to consider means whereby if the light measuring result has a luminance equal to or less than a predetermined value, it is automatically determined that the object is the night view, etc.

As a sixth example, it is possible to consider means whereby if the light measuring result has a luminance equal to or less than a predetermined value, and the image signal has an area ratio of a low contrast area having a contrast equal to or less than a predetermined value to the whole area, which is equal to or greater than a predetermined area ratio, it is automatically determined that the object is the night view, etc.

Obviously, the night view discrimination may be implemented by combining a plurality of means among the above means.

As stated above, if the distance measurement is not properly executed for the main object in the case of photographing the night view, etc., an in-focus distance is set to a predetermined short distance. Therefore, the main object such as a person is not photographed in an extremely out of focus state, and it is possible to prevent failure of photographing.

That is, a higher resolution is unnecessary when photographing a night view as compared with when photographing a scene in the daytime. Even if a resolution is reduced by the out of focus state and the like, it is hard to influence the photographed image by employing a light source which is photographed in a wide area of the night view.

As compared with a scene in the daytime, the night view requires no high in-focus precision, so that this means that the night view is what is called an adaptable object. A focal point is focused to a distance position where it is presumed that a main object is located, and it is therefore possible to prevent a large number of unsuccessful photographs.

According to the first embodiment, the camera has a the distance measuring apparatus capable of preventing an unsuccessful photograph such that a main object is made remarkably out of focus in a scene in which a night view is the background without need for increase in costs and a space, and comfortably photographing an object irrespective of a photographing scene.

Figure 9:
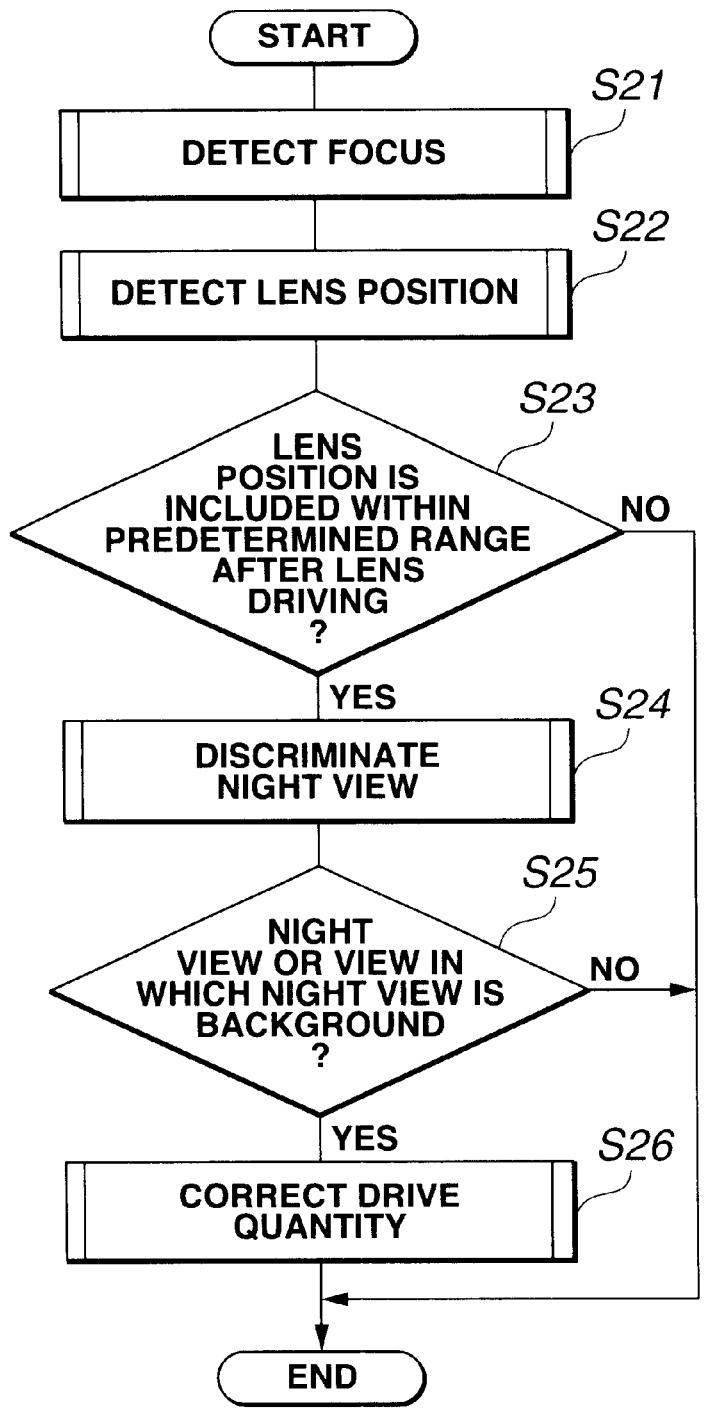
FIG. 9 is a flowchart showing a main operation of a distance measuring apparatus according to a second embodiment of the present invention.

FIG. 9 shows the second embodiment of the present invention and is a flowchart showing a main operation of the distance measuring apparatus. According to the second embodiment, the description is omitted with regard to the same portion as that in the first embodiment and only the differences are described mainly.

Although the first embodiment exemplifies the distance measuring apparatus using the ambient light passive system, the second embodiment exemplifies a distance measuring apparatus using a TTL passive (phase difference detection) system or contrast system.

According to the second embodiment, although the construction of the distance measuring apparatus is different from that in the first embodiment, portions except for that are almost similar to those according to the first embodiment. Therefore, the reference numerals in FIG. 2, etc. are referred to if the necessity may arise.

Since the present invention is not limited by a distance measuring method and a night view discriminating method, the main explanation herein relates to only portions essential for understanding a processing method which might be made different depending on a distance measuring method, with reference to FIG. 9.

Starting this process, a focus is first detected by the TTL passive (phase difference detection) system or contrast system. Calculated is a drive quantity of the optical system 8 for focus control which is necessary to be in-focus (step S21).

Next, "lens position detection" as a subroutine is executed and an absolute position of the optical system 8 for focus control is detected (step S22).

Based on the detected absolute position, it is predicted and discriminated whether or not the absolute position of the optical system 8 for focus control after driving is included within a predetermined range (an area locating at a position of a distance longer than a predetermined distance) by predicting the absolute position of the focus controlling optical system 8 after driving when it is moved by the calculated drive quantity in step S21 (step S23). If it is predicted and determined that it is not included within the predetermined range, the processing routine ends as it is.

If it is predicted that the absolute position of the optical system 8 for focus control after moving is included within a predetermined range, the photographing scene is analyzed by, e.g., "night view discrimination" as a subroutine shown in FIG. 8 (step S24). It is determined whether or not the main object is the night view itself or a view in which the night view is the background, on the basis of the analysis result (step S25). If it is determined that the main object is not the night view or the like, the processing routine ends.

If it is determined that the main object is the night view or the like, the drive quantity of the optical system 8 for focus control is corrected to a predetermined drive quantity for which the absolute position after driving is at a position of a distance nearer than the predetermined range (step S26), and the processing routine ends.

According to the second embodiment, it is also able to obtain an effect in the distance measuring apparatus using the TTL passive (phase difference detection) system or contrast system, almost similarly to that according to the first embodiment.

In this invention, it is apparent that working modes different in a wide range can be formed on the basis of this invention without departing from the spirit and the scope of the invention. This invention is not restricted by any specific embodiment except being limited by the appended claims.

What is claimed is:

1. A distance measuring apparatus comprising:
   light receiving means of a charge accumulating type, having a plurality of pixels, for light-receiving optical images which are formed by light beams of an object to be photographed which are divided into at least one pair, and outputting a signal of an object image;
   distance measuring means for outputting distance information regarding a distance to said object, based on an output by said light receiving means;

night view discriminating means for discriminating whether or not a photographing object situation is a night view or a view in which the night view is a background, based on a calculated result of the output of said light receiving means; and correcting means for correcting a photographing distance which is set to a predetermined direction with respect to the distance information output by said distance measuring means when said night view discriminating means determines that the photographing object situation is the night view or the view in which the night view is the background and the distance information output by said distance measuring means is equal to or greater than a predetermined distance.

2. The distance measuring apparatus according to claim 1, wherein the correction to the predetermined direction by said correcting means is executed to correct the output of said distance measuring means to a shorter distance side.

3. A distance measuring apparatus comprising:

light receiving means of a charge accumulating type, having a plurality of pixels, for light-receiving optical images which are formed by light beams of an object to be photographed which are divided into at least one pair, and outputting a signal of an object image;

distance measuring means for outputting distance information regarding a distance to said object, based on an output by said light receiving means;

night view discriminating means for discriminating whether or not a photographing object situation is a night view or a view in which the night view is a background, based on a calculated result of the output of said light receiving means; and correcting means for correcting a photographing distance which is set to a predetermined direction with respect to the distance information output by said distance measuring means when said night view discriminating means determines that the photographing object situation is the night view or the view in which the night view is the background and the distance information output by said distance measuring means is equal to or greater than a predetermined distance;

wherein said night view discriminating means discriminates whether or not the photographing object situation is the night view or the view in which the night view is the background, based on an average value of the output signal of said light receiving means, a width from a maximum value to a minimum value in the output signal of said light receiving means, and a charge accumulating time of said light receiving means.

4. A distance measuring apparatus comprising light receiving means of a charge accumulating type, having a plurality of pixels, for light-receiving optical images which are formed by light beams of an object to be photographed which are divided into at least one pair, and outputting a signal of an object image;

distance measuring means for outputting distance information regarding a distance to said object, based on an output by said light receiving means;

night view discriminating means for discriminating whether or not a photographing object situation is a night view or a view in which the night view is a background, based on a calculated result of the output of said light receiving means; and correcting means for correcting a photographing distance which is set to a predetermined direction with respect to the distance information output by said distance measuring means when said night view discriminating means determines that the photographing object situation is the night view or the view in which the night view is the background and the distance information output by said distance measuring means is equal to or greater than a predetermined distance;

wherein the correction to the predetermined direction by said correcting means is executed to correct the output of said distance measuring means to a shorter distance side; and wherein said night view discriminating means discriminates whether or not the photographing object situation is the night view or the view in which the night view is the background, based on an average value of the output signal of said light receiving means, a width from a maximum value to a minimum value in the output signal of said light receiving means, and a charge accumulating time of said light receiving means.

5. A distance measuring apparatus for image-forming light from an object to be photographed on at least one pair of photoelectric converting element arrays through at least one pair of light receiving means and calculating an object distance from at least two object signals obtained, comprising:

distance discriminating means for discriminating whether the object distance corresponding to a distance measuring result is less than or greater than a first predetermined distance;

night view discriminating means for discriminating whether or not the object is based on a night view or a view in which the night view is a background, based on a calculating result of the output by said light receiving means; and distance measuring result changing means for changing and setting the object distance based on the distance measuring result to a second predetermined distance, when said distance discriminating means determines that the object distance is greater than the first predetermined distance and said night view discriminating means determines that the object is based on the night view in which the night view is the background.

6. The distance measuring apparatus according to claim 5, wherein said second predetermined distance is set to a distance side less than said first predetermined distance.

7. A distance measuring means in a camera for receiving light from an object by light receiving means, obtaining an object image signal, and controlling a focus on the basis of the obtained object image signal, comprising:

in-focus distance predicting means for predicting an absolute position of an in-focus distance of a focus control optical system after in-focus driving from a focus detecting result, and predicting whether said absolute position is within a predetermined range or not;

night view discriminating means for discriminating whether or not the object is based on a night view or a view in which the night view is a background, based on a calculating result of the output by said light receiving means; and focus control correcting means for correcting a drive quantity so that the focus control distance for actual in-focus drive is shorter than said predetermined range, when said in-focus distance predicting means determines that the in-focus distance is within the predetermined range and said night view discriminating means determines that the object is based on the night view in which the night view is the background.

8. A distance measuring apparatus for image-forming light from an object to be photographed on at least one pair of photoelectric converting element arrays through at least one pair of light receiving means and calculating an object distance from at least two object signals obtained, comprising:

distance discriminating means for discriminating whether the object distance corresponding to a distance measuring result is less than or greater than a first predetermined distance;

night view discriminating means for discriminating whether or not the object is based on a night view or a view in which the night view is a background;

distance measuring result changing means for changing and setting the object distance based on the distance measuring result to a second predetermined distance, when said distance discriminating means determines that the object distance is greater than the first predetermined distance and said night view discriminating means determines that the object is based on the night view in which the night view is the background;

integrating time discriminating means for counting a time necessary for an integrating operation to obtain the object image signal by the photoelectric converting element array, and comparing the counted time with a predetermined time;

integrating width discriminating means for obtaining a difference between a maximum value and a minimum value of the object image signal, and comparing the difference with a first predetermined value; and integrating average discriminating means for obtaining an average value of the object image signal and comparing the average value with a second predetermined value, wherein said night view discriminating means discriminates whether or not the night view or the view in which the night view is the background, based on determining results of said integrating time discriminating means, said integrating width discriminating means, and said integrating average discriminating means.

9. A distance measuring apparatus in a camera for receiving light from an object by light receiving means, obtaining an object image signal, and controlling a focus on the basis of the obtained object image signal, comprising:

in-focus distance predicting means for predicting an absolute position of an in-focus distance of a focus control optical system after in-focus driving from a focus detecting result, and predicting whether said absolute position is within a predetermined range or not;

night view discriminating means for discriminating whether or not the object is based on a night view or a view in which the night view is a background;

focus control correcting means for correcting a drive quantity so that the focus control distance for actual in-focus drive is shorter than said predetermined range, when said in-focus distance predicting means determines that the in-focus distance is within the predetermined range and said night view discriminating means determines that the object is based on the night view in which the night view is the background;

integrating time discriminating means for counting a time necessary for an integrating operation to obtain the object image signal by the photoelectric converting element array as said light receiving means, and comparing the counted time with a predetermined time;

integrating width discriminating means for obtaining a difference between a maximum value and a minimum value of the object image signal, and comparing the difference with a first predetermined value; and integrating average discriminating means for obtaining an average value of the object image signal and comparing the average value with a second predetermined value, wherein said night view discriminating means discriminates whether or not the object is based on the night view or a view in which the night view is the background, based on determining results of said integrating time discriminating means, said integrating width discriminating means, and said integrating average discriminating means.

* * * * *